United States Patent
Zhou et al.

(10) Patent No.: US 11,006,326 B2
(45) Date of Patent: May 11, 2021

(54) METHOD, DEVICE, AND SYSTEM FOR IMPLEMENTING SESSION CONTINUITY

(71) Applicant: ZTE Corporation, Guangdong (CN)

(72) Inventors: Xiaoyun Zhou, Guangdong (CN); Jinguo Zhu, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 149 days.

(21) Appl. No.: 16/242,993

(22) Filed: Jan. 8, 2019

(65) Prior Publication Data

US 2019/0223060 A1 Jul. 18, 2019

Related U.S. Application Data

(63) Continuation of application No. PCT/CN2017/092282, filed on Jul. 7, 2017.

(30) Foreign Application Priority Data

Jul. 8, 2016 (CN) .......................... 201610543593.5

(51) Int. Cl.
*G08C 17/00* (2006.01)
*H04W 36/00* (2009.01)
(Continued)

(52) U.S. Cl.
CPC ......... *H04W 36/0022* (2013.01); *H04L 29/08* (2013.01); *H04W 36/0016* (2013.01); *H04W 36/30* (2013.01); *H04W 88/16* (2013.01)

(58) Field of Classification Search
CPC ............. H04W 36/00; H04W 36/0005; H04W 36/0016; H04W 36/18; H04W 36/0011
See application file for complete search history.

(56) References Cited

U.S. PATENT DOCUMENTS

| 2003/0161331 A1* | 8/2003 | Ochi ...................... H04L 41/00 370/400 |
| 2011/0145419 A1 | 6/2011 | Shaheen et al. |

(Continued)

FOREIGN PATENT DOCUMENTS

| CN | 101247637 A | 8/2008 |
| CN | 101753963 A * | 11/2008 |

(Continued)

OTHER PUBLICATIONS

3GPP, "3rd Generation Partnership Project; Technical Specification Group Services and Systems Aspects; Study on Architecture for Next Generation System (Release 14)"; 3GPP TR 23.799 V0A.0, Sophia Antipolis, Valbonne, France, 96 pages, Apr. 2016.

(Continued)

*Primary Examiner* — Shantell L Heiber
(74) *Attorney, Agent, or Firm* — Perkins Coie LLP

(57) ABSTRACT

Provided is a method and device for implementing session continuity. The method includes: transmitting indication information to a user equipment (UE), where the indication information is used for informing the UE to release a current first protocol data unit (PDU) session and establish a second PDU session to the same data network; and receiving a request message, initiated by the UE after the indication information is received by the UE, for establishing the second PDU session, where the request message carries a session identifier of the first PDU session for uniquely identifying the first PDU session. The above-mentioned technical solution solves the problem in the related art that it is impossible to determine from which PDU session the newly established PDU session is switched over when the UE is redirected to a new TUPF. Thus the network side is able to determine from which PDU session the newly established PDU session is redirected.

15 Claims, 9 Drawing Sheets

(51) Int. Cl.
*H04L 29/08* (2006.01)
*H04W 36/30* (2009.01)
*H04W 88/16* (2009.01)

(56) References Cited

U.S. PATENT DOCUMENTS

| | | | | |
|---|---|---|---|---|
| 2013/0287002 | A1* | 10/2013 | Kim | H04W 76/38 |
| | | | | 370/331 |
| 2014/0169330 | A1* | 6/2014 | Rommer | H04W 36/08 |
| | | | | 370/331 |
| 2017/0290082 | A1* | 10/2017 | Salkintzis | H04W 36/0011 |
| 2019/0208465 | A1* | 7/2019 | Mihaly | H04W 8/08 |

FOREIGN PATENT DOCUMENTS

| | | | |
|---|---|---|---|
| WO | 2015096012 A1 | | 7/2015 |
| WO | WO2018006017 | * | 6/2017 |

OTHER PUBLICATIONS

Cisco Systems et al., "Interim agreements on support for session and service continuity and efficient user plane path", 3GPP SA WG2 Meeting #116, Vienna, Austria, S2-163410, 5 pages, Jul. 2016.
Cisco Systems, Inc. et al., System enablers for session and service continuity, 3GPP SA WG2 Meeting #114, Sophia Antipolis, France, S2-161979, 10 pages, Apr. 2016.
Extended Search Report dated May 27, 2020 for European Application No. 17823690.7, filed on Feb. 8, 2019 (8 pages).
International Search Report and Written Opinion dated Sep. 27, 2017 for International Application No. PCT/CN2017/092282, filed on Jul. 7, 2017 (15 pages).

* cited by examiner

METHOD, DEVICE, AND SYSTEM FOR IMPLEMENTING SESSION CONTINUITY

CROSS REFERENCE TO RELATED APPLICATIONS

This patent application is a continuation of and claims priority to International Patent Application No. PCT/CN2017/092282, filed on Jul. 7, 2017, which claims the benefit of priority of Chinese Patent Application No. 201610543593.5, filed on Jul. 8, 2016. The entire contents of the before-mentioned patent applications are incorporated by reference as part of the disclosure of this application.

TECHNICAL FIELD

The present disclosure relates to the field of communications, and in particular, to a method, device and system for implementing session continuity.

BACKGROUND

FIG. 1 is a schematic diagram of a 4G network architecture in the related art. As shown in FIG. 1, network elements described below are included in the architecture. A user equipment (UE) is accessed to a 4G network and obtains services mainly via a radio air interface. The UE interacts with a base station via the air interface, and interacts with a mobility management entity (MME) of a core network via non-access-stratum (NAS) signaling. A radio access network (RAN) base station is responsible for scheduling air interface resource through which the UE is accessed to the network and connection management of the air interface, and is further responsible for detecting uplink and downlink rates of a user to ensure that the maximum uplink and downlink rates allowed for the user are not exceeded.

A mobility management entity (MME) is served as a control plane unit of a core network and mainly responsible for: user authentication, authorization and subscription checking, to ensure that a user is a valid user; user mobility management, including location registration and temporary identifier allocation; maintenance and migration of an IDLE state and a CONNECT state; a handover in the CONNECT state; connection and bearer maintenance of the packet data network (PDN), including session management functions like creating, modifying and deleting a session; and paging triggering in the IDLE state of a user, and other functions.

A serving gateway (GW) is served as a user plane functional unit of the core network and mainly responsible for interacting with a packet data network (PDN) GW in the case of roaming; caching downlink data packets received and notifying the MME to page the user when the user is in the IDLE state; and acting as an anchor for the user plane during inter-RAN handovers and as the anchor for mobility across 2G/3G/4G systems.

The PDN GW is served as a user plane functional unit of the core network and is an access point for the UE to access the PDN. The PDN GW is responsible for user Internet Protocol (IP) address allocation, the establishment, modification and deletion of the network-triggered bearer, Quality of Service (QoS) control, charging and other functions, and is the anchor of the user within the third generation partnership project (3GPP) system and between 3GPP and non-3GPP systems, and thus the IP address is ensured to be unchanged and service continuity is ensured. The PDN GW is further responsible for detecting the uplink and downlink rates of a session to ensure that the maximum uplink and downlink rates allowed to the user session are not exceeded.

The industry is currently researching the next generation wireless communication system and a schematic diagram of the architecture shown in FIG. 2 is proposed. In FIG. 2, The user plane functional entities includes a terminating user-plane function (TUPF) entity served as an entry point for the UE to access a data network (DN). The control plane functional entities include an access and mobility management function (AMF) entity responsible for access control and mobility management of the UE, and a session management function (SMF) entity responsible for session management. In the process of researching the next generation wireless communication system, new requirements and solutions for service continuity are proposed. Three modes of session and service continuity (SSC) are defined.

Mode 1: The TUPF remains unchanged no matter how an access network (AN) used by the UE changes.

Mode 2: The TUPF remains unchanged when the UE only moves in a subset of the attachment point of the access network. When the UE leaves a service area of the TUPF, a different TUPF suitable for an attachment point of a current access network for the UE will be used to serve the UE.

Mode 3: As shown in FIG. 3, the UE is allowed to establish a new protocol data unit (PDU) session to the same DN before the previous PDU session is finally terminated. When the UE requests to establish the new PDU session, the network selects a TUPF suitable for the UE's new network attachment point. When two PDUs are simultaneously activated, the UE migrates the application from the previous PDU session to the new PDU session, or the UE waits for the application bound to the previous PDU session to end.

In order to ensure service continuity, in mode 3, if the application supports service continuity, the UE may migrate the application bound to the previous PDU session to the new PDU session. However, problems described below exist. First, as shown in FIG. 4, the UE establishes two PDU sessions (one of which is PDU session 1, and the other is PDU session 2) in the same DN through an AN1, and the network selects the same TUPF (i.e., TUPF) for the two PDU sessions. The two PDU sessions have the same user id and the same DN name. In order to implement policy control on the PDU sessions, two policy control sessions (i.e., policy control session 1 and policy control session 2) are respectively established between the control plane (CP) and the policy function. The UE accesses the application through the PDU session 1, so that the AF establishes an AF session 1 to provide service information, and the CP correlates the AF session 1 with the PDU session 1. The UE accesses an application through the PDU session 1. The AF corresponding to the application establishes the AF session 1 to provide service information to the policy function, and the policy function correlates the AF session 1 with the policy control session 1.

Subsequently, as shown in FIG. 5, the network indicates the UE that the PDU session 1 and PDN session 2 need to be redirected to a new TUPF when the UE moves to the AN2. According to the network indication, the UE establishes a new PDU session 3. During the process of establishing the PDU session 3, the UE carries the user id and the DN name, while the policy function fails to determine a PDU session from which the PDU session 3 is switched. Therefore, it is impossible to determine whether to correlate the AF session 1 with the PDU session 3 (i.e., policy control session 3).

Similarly, if other network functional entities (such as the SMF) on the network fail to determine the PDU session from which the PDU session 3 is switched over, the SMF is unable to select the same policy function. Further, if the AMF fails to determine the PDU session from which the PDU session 3 is switched over, the AMF is unable to select the same SMF and then cannot select the same policy function. In addition, if the same SMF cannot be selected, some of original contexts on the SMF cannot be reused, which reduces processing efficiency and increases signaling overhead.

In the related art, when the UE is redirected to a new TUPF, it is impossible to determine from which PDU session the newly established PDU session is switched over. An effective solution has not been proposed.

SUMMARY

Embodiments of the present disclosure provide a method, device and system for implementing session continuity, to solve at least the problem in the related art that it is impossible to determine from which PDU session the newly established PDU session is switched over when the UE is redirected to a new TUPF.

An embodiment of the present disclosure provides a method for implementing session continuity. The method includes:

transmitting indication information to a UE, where the indication information is used for informing the UE to release a current first protocol data unit (PDU) session and establish a second PDU session to the same data network; and receiving a request message, initiated by the UE after the indication information is received by the UE, for establishing the second PDU session, where a session identifier of the first PDU session is carried in the request message, the session identifier of the first PDU session is used for uniquely identifying the first PDU session.

Another embodiment of the present disclosure further provides a method for implementing session continuity. The method includes:

receiving a request message, initiated by a UE, for establishing a second PDU session, where a session identifier of the first PDU session is carried in the request message, the session identifier of the first PDU session is used for uniquely identifying the first PDU session; and selecting a session management function (SMF) of the first PDU session for the second PDU session according to the session identifier of the first PDU session.

Another embodiment of the present disclosure further provides a method for implementing session continuity. The method includes:

receiving a request message, requested by a UE, for establishing a second policy control session corresponding to a second PDU session, where a session identifier of the first PDU session is carried in the request message, the session identifier of the first PDU session is used for uniquely identifying the first PDU session; and correlating the second policy control session with an application function (AF) session according to the session identifier of the first PDU session carried in the request message, where the AF session is established when the UE accesses a specified application through the first PDU session.

Another embodiment of the present disclosure further provides a method for implementing session continuity. The method includes:

receiving, by a UE, indication information from a network, where the indication information is used for informing the UE to release a current first protocol data unit (PDU) session and establish a second PDU session in a same data network; and transmitting, by the UE, a request message for establishing the second PDU session to the network, where a session identifier of the first PDU session is carried in the request message, the session identifier of the first PDU session is used for uniquely identifying the first PDU session.

Another embodiment of the present disclosure further provides a device for implementing session continuity. The device includes:

a first transmitting module configured to transmit indication information to a UE, where the indication information is used for informing the UE to release a current first protocol data unit (PDU) session and establish a second PDU session to the same data network; and a first receiving module configured to receive a request message, initiated by the UE after the indication information is received by the UE, for establishing the second PDU session, where a session identifier of the first PDU session is carried in the request message, the session identifier of the first PDU session is used for uniquely identifying the first PDU session.

Another embodiment of the present disclosure further provides a device for implementing session continuity. The device includes:

a second receiving module configured to receive a request message, initiated by a UE, for establishing a second PDU session, where a session identifier of the first PDU session is carried in the request message, the session identifier of the first PDU session is used for uniquely identifying the first PDU session; and a selection module configured to select a session management function (SMF) of the first PDU session for the second PDU session according to the session identifier of the first PDU session.

Another embodiment of the present disclosure further provides a device for implementing session continuity. The device includes:

a third receiving module configured to receive a request message, requested by a UE, for establishing a second policy control session corresponding to a second PDU session, where a session identifier of the first PDU session is carried in the request message, the session identifier of the first PDU session is used for uniquely identifying the first PDU session; and a correlation module configured to correlate the second policy control session with an application function (AF) session according to the session identifier of the first PDU session carried in the request message, where the AF session is established when the UE accesses a specified application through the first PDU session.

Another embodiment of the present disclosure further provides a device for implementing session continuity applied to a UE. The device includes:

a fourth receiving module configured to receive indication information from a network, where the indication information is used for informing a UE to release a current first protocol data unit (PDU) session and establish a second PDU session to the same data network; and a second transmitting module configured to transmit a request message for establishing the second PDU session to the network, where a session identifier of the first PDU session is carried in the request message, the session identifier of the first PDU session is used for uniquely identifying the first PDU session.

The embodiments of the present disclosure further provide a computer storage medium, which may be configured to store executable instructions for executing the methods for implementing session continuity according to the above embodiments.

According to the embodiments of the present disclosure, request information for establishing the second PDU session transmitted by the UE is received and carries the session identifier of the first PDU session for uniquely identifying the first PDU session. The above-mentioned technical solution solves the problem in the related art that it is impossible to determine from which PDU session the newly established PDU session is switched over when a UE is redirected to a new TUPF. Thus the network side is able to determine from which PDU session the newly established PDU session is redirected.

BRIEF DESCRIPTION OF DRAWINGS

The drawings described herein are used to provide a further understanding of the present disclosure and form a part of the present application. The exemplary embodiments and descriptions thereof in the present disclosure are used to explain the present disclosure and not to limit the present disclosure in any improper way. In the drawings.

DETAILED DESCRIPTION

Figure 1:
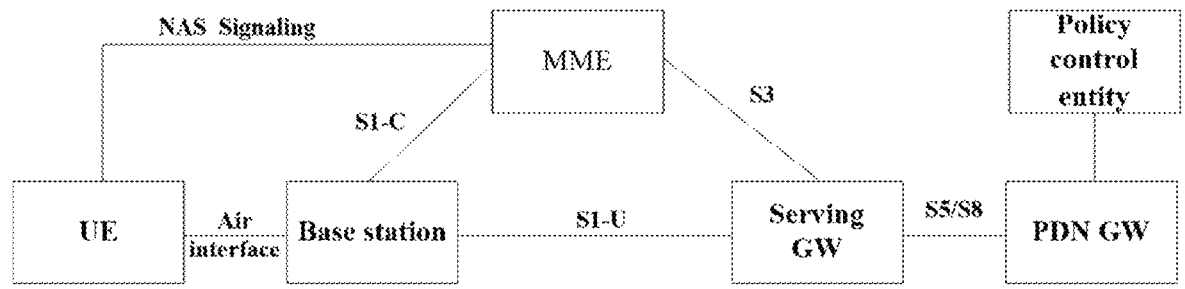
FIG. 1 is a schematic diagram showing a 4G network architecture in the related art.
Figure 2:
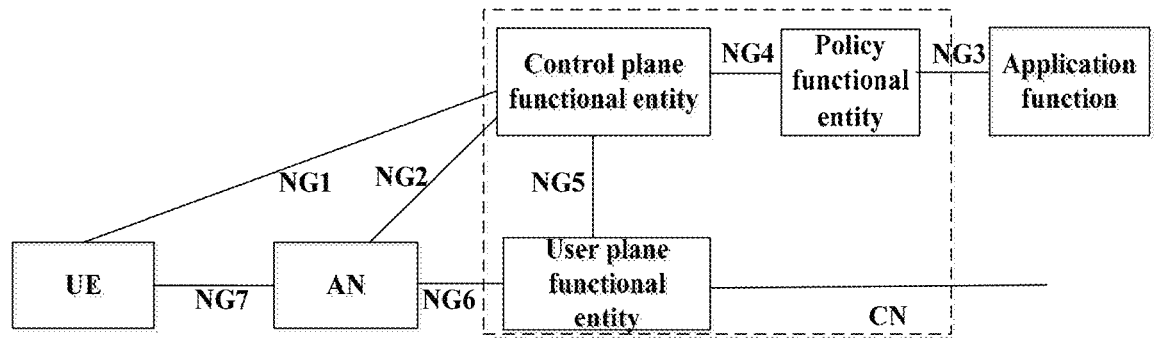
FIG. 2 is a structural diagram showing a next generation wireless communication system in the related art.
Figure 4:
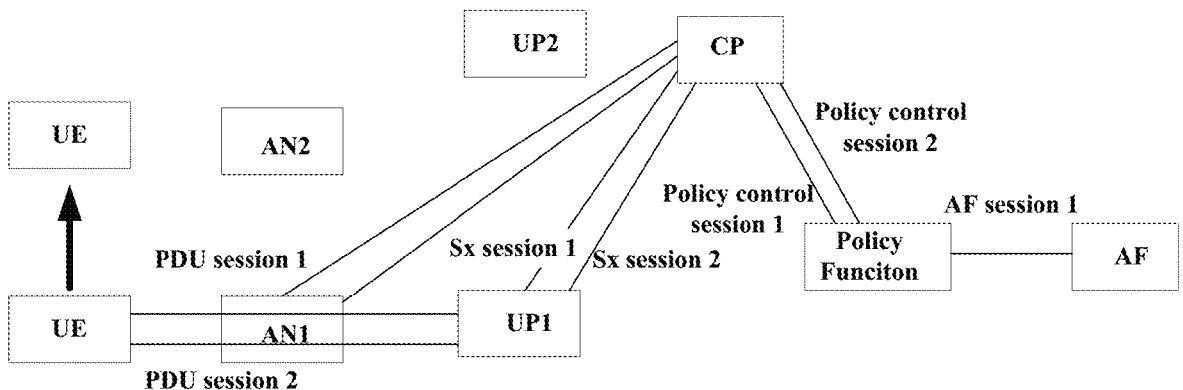
FIG. 4 is a schematic diagram (1) showing a problem in the related art.
Figure 3:
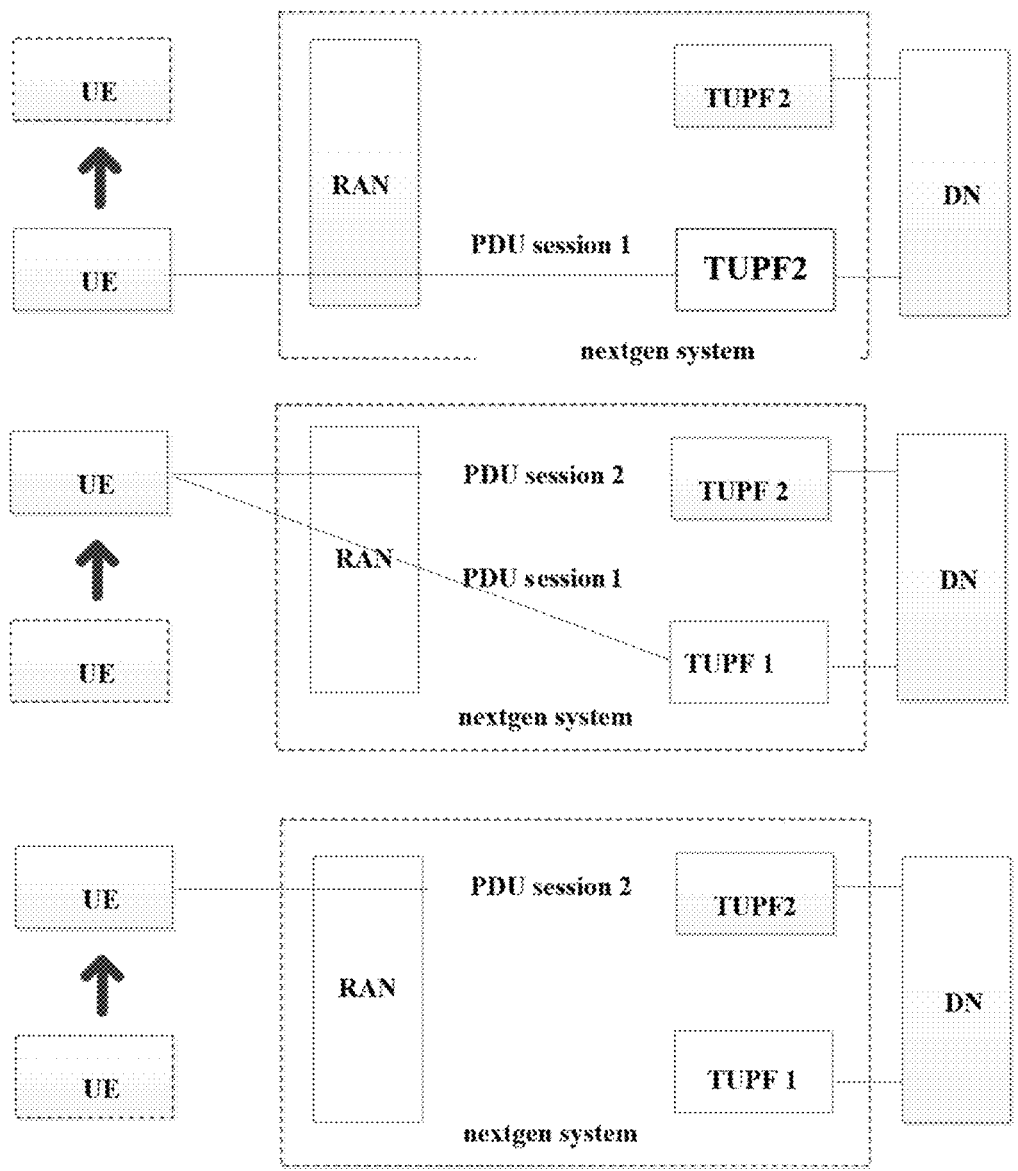
FIG. 3 is a schematic diagram showing a SSC mode 3 in the related art.
Figure 5:
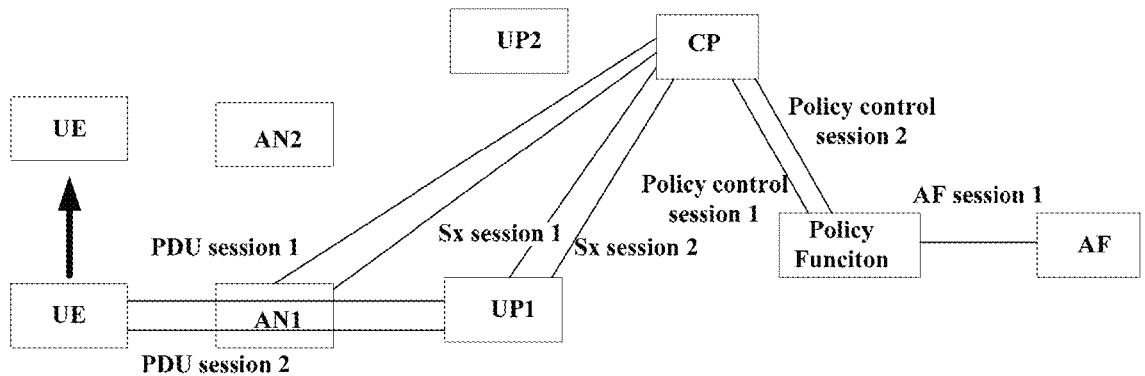
FIG. 5 is a schematic diagram (2) showing a problem in the related art.
Figure 5:
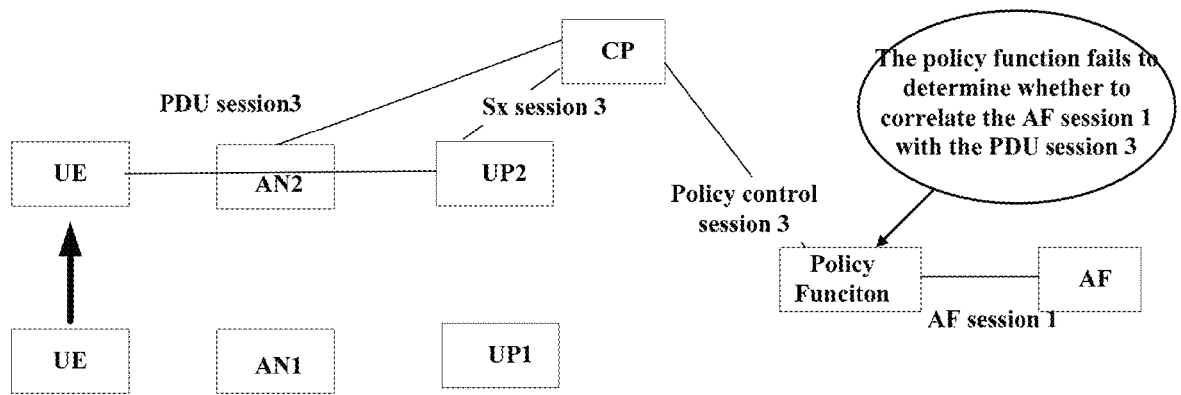

Hereinafter the present disclosure will be described in detail with reference to the drawings in conjunction with the embodiments. It is to be noted that if not in collision, the embodiments and features therein in the present application may be combined with each other.

It is to be noted that the terms "first", "second" and the like in the specification, claims and drawings of the present disclosure are used to distinguish between similar objects and are not necessarily used to describe a particular order or sequence. It is to be understood that the data used in this way is interchangeable where appropriate so that embodiments of the present disclosure described herein may also be implemented in a sequence not illustrated or described herein. In addition, the terms "comprising", "including" or any other variations thereof described herein are intended to encompass a non-exclusive inclusion. For example, a process, method, system, product or device that includes a series of steps or elements may include not only the expressly listed steps or elements but also other steps or elements that are not expressly listed or are inherent to such a process, method, system, product or device.

Embodiment I

A method embodiment for processing page content is also provided according to an embodiment of the present disclosure. It is to be noted that steps illustrated in the flowcharts in the drawings may be performed by a computer system such as a group of computers capable of executing instructions, and although logical sequences are illustrated in the flowcharts, the illustrated or described steps may be performed in sequences different from those described herein in some cases.

Figure 6:
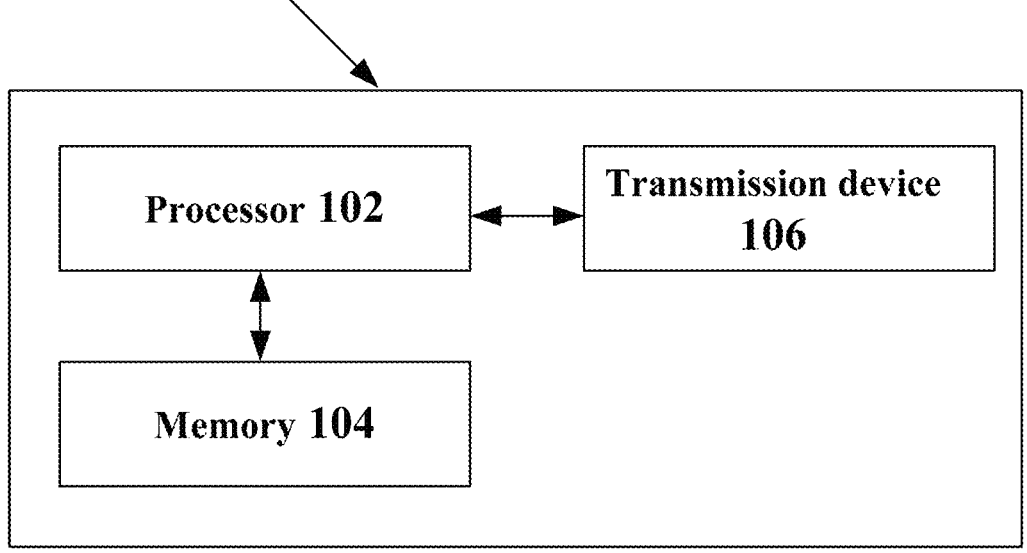
FIG. 6 is a block diagram showing a hardware structure of a computer terminal for implementing session continuity according to an embodiment of the present disclosure.

The method embodiment provided by embodiment I of the present application may be executed on a mobile terminal, a computer terminal or other similar computing devices. When the method is executed on a computer terminal, FIG. 6 shows a hardware structure of the computer terminal for implementing session continuity according to the embodiment of the present disclosure. As shown in FIG. 6, a computer terminal 10 may include: one or more (only one is shown in FIG. 1) processors 102 (which may include, but are not limited to, a micro-processor MCU, a programmable logic device FPGA, or another processing device); a memory 104 for storing data, and a transmission device 106 for implementing communication function. It should be understood by those of ordinary skill in the art that the structure shown in FIG. 6 is merely illustrative and not intended to limit structures of the electronic devices described above. For example, the computer terminal 10 may further include more or fewer components than the components shown in FIG. 6, or has a configuration different from the configuration shown in FIG. 6.

The memory 104 is configured to store software programs and modules of application software, such as program instructions/modules corresponding to the method for processing page content in the embodiment of the present disclosure. The processor 102 is configured to execute the software programs and modules stored in the memory 104 so as to perform various function applications and data processing, that is, to implement a vulnerability detection method of the application programs described above. The memory 104 may include a high-speed random-access memory, and may further include a nonvolatile memory, such as one or more magnetic storage devices, flash memories or other nonvolatile solid-state memories. In some examples, the memory 104 may further include memories that are remotely disposed relative to the processor 102. These remote memories may be connected to the computer terminal 10 via a network. Examples of the network described above include, but are not limited to, the Internet, an intranet, a local area network, a mobile communication network and a combination thereof.

The transmission device 106 is configured to receive or transmit data via a network. Specific examples of the above-mentioned network may include a wireless network provided by a communication provider of the computer terminal 10. In an example, the transmission device 106 includes a network interface controller (NIC), which may be connected to other network devices via a base station and thus be capable of communicating with the Internet. In another example, the transmission device 106 may be a radio frequency (RF) module configured to communicate with the Internet in a wireless way.

Figure 7:
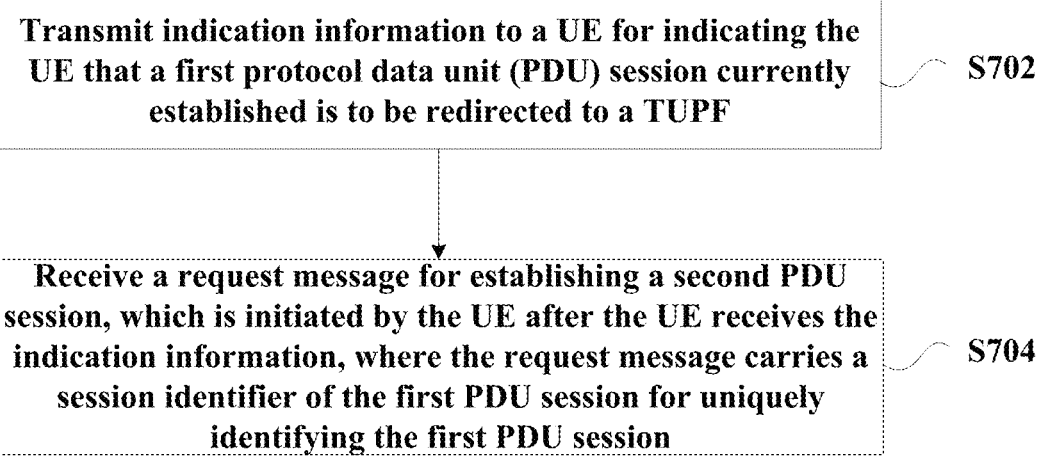
FIG. 7 is a flowchart showing a method for implementing session continuity according to embodiment I of the present disclosure.

In the above operating environment, the present application provides a method for implementing session continuity as shown in FIG. 7. FIG. 7 is a flowchart showing a method for implementing session continuity according to embodiment I of the present disclosure. As shown in FIG. 7, steps described below are included.

In S702, indication information, which is used for indicating a UE to redirect a first protocol data unit (PDU) session currently established to a TUPF, is transmitted to the UE.

In S704, a request message for establishing a second PDU session, which is initiated by the UE after the UE receives the indication information, is received. The request message carries a session identifier of the first PDU session for uniquely identifying the first PDU session.

In the steps described above, after the indication information for indicating the UE to redirect the first protocol data unit (PDU) session currently established to the TUPF is transmitted to the UE, the request message for establishing the second PDU session, which is transmitted from the UE, is received. The request message carries the session identifier of the first PDU session for uniquely identifying the first PDU session. The above-mentioned technical solution solves the problem in the related art that it is impossible to determine from which PDU session the newly established PDU session is switched over when the UE is redirected to a new TUPF. Thus the network side is able to determine from which PDU session the newly established PDU session is redirected.

In an optional embodiment, after step S704 is performed, the second PDU session is determined as a session redirected from the first PDU session according to the session identifier of the first PDU session carried in the request message; and/or the second PDU session is correlated with an application function (AF) session according to the session identifier of the first PDU session carried in the request message. The AF session is established when the UE accesses a specified application through the first PDU session.

Of course, in the actual application process, after the second PDU session is correlated with the application function (AF) session according to the session identifier of the first PDU session carried in the request message, a notification of the TUPF redirecting event may further be transmitted to the AF, and updated service information provided by the AF may further be received through the AF session.

In the present embodiment, the session identifier of the first PDU session includes at least one of: a user identifier (ID), a name of a data network, and an Internet Protocol (IP) address or IPv6 prefix of the first PDU session.

Optionally, the session identifier of the first PDU session may further include at least one of: a session identifier allocated to the first PDU session when the first PDU session is established; an Internet Protocol (IP) address or IPv6 prefix of the first PDU session; and a session identifier allocated to the first PDU session when the first PDU session is redirected.

Embodiment II

Figure 8:
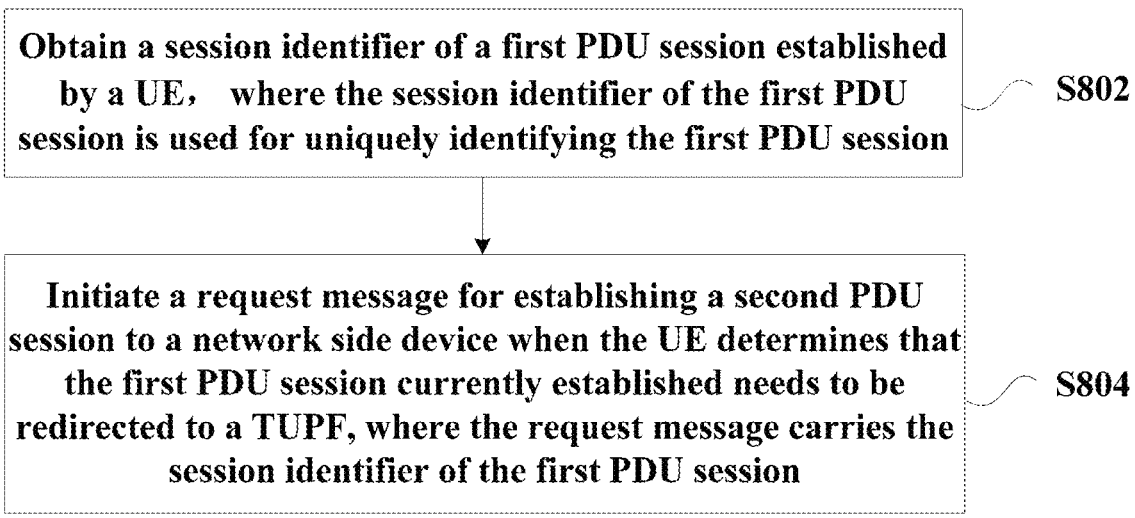
FIG. 8 is a flowchart showing a method for implementing session continuity according to embodiment II of the present disclosure.

A description is mainly made from the network side device in FIG. 7 in embodiment I. In order to improve the above-mentioned technical solution, a method for implementing session continuity is further provided in the present embodiment. FIG. 8 is a flowchart showing a method for implementing session continuity according to embodiment II of the present disclosure. As shown in FIG. 8, steps described below are included.

In S802, a session identifier of a first PDU session established by a UE is obtained, where the session identifier of the first PDU session is used for uniquely identifying the first PDU session.

In S804, a request message for establishing a second PDU session is initiated to the network side device when the UE determines that the first PDU session currently established needs to be redirected to the terminating user-plane function (TUPF). The request message carries the session identifier of the first PDU session.

In the steps described above, after the session identifier of the first PDU session is obtained, the request message for establishing the second PDU session is initiated to the network side device and the request message carries the session identifier of the first PDU session. The above-mentioned technical solution solves the problem in the related art that it is impossible to determine from which PDU session the newly established PDU session is switched over when a UE is redirected to a new TUPF. Thus the network side is able to determine from which PDU session the newly established PDU session is redirected.

In the present embodiment, the session identifier of the first PDU session includes at least one of: a user identifier (user ID), a name of a data network, and an IP address or IPv6 prefix of the first PDU session.

Optionally, the session identifier of the first PDU session may further include at least one of: a session identifier allocated to the first PDU session when the first PDU session is established; an Internet Protocol (IP) address or IPv6 prefix of the first PDU session; and a session identifier allocated to the first PDU session when the first PDU session is redirected.

In order to better understand the interaction process between the network side device and the UE described above, a system for implementing session continuity is further provided in the embodiment of the present disclosure, including: a UE and a network side device.

The UE is configured to receive indication information which is used for indicating the UE that a first protocol data unit (PDU) session currently established needs to be redirected to a terminating user-plane function (TUPF).

The network side device is configured to receive a request message for establishing the second PDU session initiated by the UE after the UE receives the indication information. The request message carries a session identifier of the first PDU session, where the session identifier of the first PDU session is used for uniquely identifying the first PDU session.

In the interaction process between the network side device and the UE described above, after transmitting the indication information to the UE so as to indicate the UE to redirect the first protocol data unit (PDU) session currently established to the TUPF, the network side device receives the request message for establishing the second PDU session. The request message carries the session identifier of the first PDU session for uniquely identifying the first PDU session. The above-mentioned technical solution solves the problem in the related art that it is impossible to determine from which PDU session the newly established PDU session is switched over when the UE is redirected to a new TUPF. Thus the network side is able to determine from which PDU session the newly established PDU session is redirected.

Optionally, the network side device is further configured to at least determine the second PDU session as a session redirected from the first PDU session according to the session identifier of the first PDU session carried in the request message.

In an alternative embodiment of the present embodiment, the network side device is further configured to correlate the second PDU session and the application function (AF) session according to the session identifier of the first PDU session carried in the request message. The AF session is established when the UE accesses a specified application through the first PDU session.

An embodiment of the present disclosure further provides a method for implementing session continuity. The method includes steps described below.

Indication information is transmitted to a UE, where the indication information is used for informing the UE to release a current first protocol data unit (PDU) session and establish a second PDU session to the same data network.

A request message for establishing the second PDU session, which is initiated by the UE after the UE receives the indication information, is received, where the request message carries a session identifier of the first PDU session for uniquely identifying the first PDU session.

Optionally, after the request message for establishing the second PDU session, which is initiated by the UE after the UE receives the indication information, is received, the method further includes steps described below.

The second PDU session is determined as a session redirected from the first PDU session or is triggered by the indication information according to the session identifier of the first PDU session carried in the request message.

Optionally, after the request message for establishing the second PDU session, which is initiated by the UE after the UE receives the indication information, is received, the method further includes steps described below.

A policy functional entity of the first PDU session is selected for the second PDU session according to the session identifier of the first PDU session.

Optionally, the session identifier of the first PDU session includes at least one of: a session identifier allocated to the first PDU session when the first PDU session is established; an IP address or IPv6 prefix of the first PDU session; and a session identifier allocated to the first PDU session when the first PDU session is redirected.

Another embodiment of the present disclosure further provides a method for implementing session continuity.

A request message for establishing a second PDU session, which is initiated by a UE, is received, where the request message carries a session identifier of a first PDU session for uniquely identifying the first PDU session.

A session management function (SMF) of the first PDU session is selected for the second PDU session according to the session identifier of the first PDU session.

Optionally, before the request message for establishing the second PDU session, which is initiated by the UE, is received, the method further includes steps described below.

The SMF is selected for the first PDU session and a correspondence between the session identifier of the first PDU session and the SMF is saved during an establishment process of the first PDU session.

Or the SMF is selected for the first PDU session during the establishment process of the first PDU session, and the correspondence between the session identifier of the first PDU session and the SMF is saved during a process in which the SMF notifies the UE that a current first protocol data unit (PDU) session is to be released and the second PDU session needs to be established.

Optionally, after the request message for establishing the second PDU session, which is initiated by the UE, is received, the method further includes steps described below.

The second PDU session is correlated with an application function (AF) session according to the session identifier of the first PDU session carried in the request message, where the AF session is established when the UE accesses a specified application through the first PDU session.

Optionally, the session identifier of the first PDU session includes at least one of: a session identifier allocated to the first PDU session when the first PDU session is established; an IP address or IPv6 prefix of the first PDU session; and a session identifier allocated to the first PDU session when the first PDU session is redirected.

Another embodiment of the present disclosure further provides a method for implementing session continuity. The method includes steps described below.

A request message for establishing a second policy control session corresponding to a second PDU session, which is requested by a UE, is received, where the request message carries a session identifier of a first PDU session for uniquely identifying the first PDU session.

The second policy control session is correlated with an application function (AF) session according to the session identifier of the first PDU session carried in the request message, where the AF session is established when the UE accesses a specified application through the first PDU session.

Optionally, the session identifier of the first PDU session includes at least one of: a session identifier allocated to the first PDU session when the first PDU session is established; an IP address or IPv6 prefix of the first PDU session; and a session identifier allocated to the first PDU session when the first PDU session is redirected.

Optionally, after the second policy control session is correlated with the application function (AF) session according to the session identifier of the first PDU session carried in the request message, the method further includes steps described below.

An event notification regarding user plane function reselection is transmitted to the AF.

Another embodiment of the present disclosure further provides a method for implementing session continuity. The method includes steps described below.

A UE receives indication information from a network. The indication information is used for informing the UE to release a current first protocol data unit (PDU) session and establish a second PDU session to the same data network.

The UE transmits a request message for establishing the second PDU session to the network. The request message carries a session identifier of the first PDU session for uniquely identifying the first PDU session.

Optionally, before the UE receives the indication information from the network, the method further includes one of the following steps described below.

The UE allocates the session identifier of the first PDU session in a process of establishing the first PDU session.

The UE receives the session identifier of the first PDU session in the process of establishing the first PDU session.

Alternatively, the UE obtains the session identifier of the first PDU session from the indication information.

Optionally, the session identifier of the first PDU session includes at least one of: a session identifier allocated to the first PDU session when the first PDU session is established; an IP address or IPv6 prefix of the first PDU session; and a session identifier allocated to the first PDU session when the first PDU session is redirected.

From the description of the implementation modes described above, it will be apparent to those skilled in the art that the method in the embodiments described above may be implemented by software plus a necessary general-purpose hardware platform, or may of course be implemented by hardware. However, in many cases, the former is a preferred implementation mode. Based on this understanding, the solution provided by the present disclosure substantially, or the part contributing to the related art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device, etc.) to execute the method according to each embodiment of the present disclosure.

Embodiment III

The present embodiment further provides a device for implementing session continuity. The device is configured to implement the above-mentioned embodiments and preferred embodiments. What has been described will not be repeated. As used below, the term "module" may be software, hardware or a combination thereof capable of implementing predetermined functions. The device in the embodiment described below is preferably implemented by software, but implementation by hardware or by a combination of software and hardware is also possible and conceived.

Figures 9, 11:
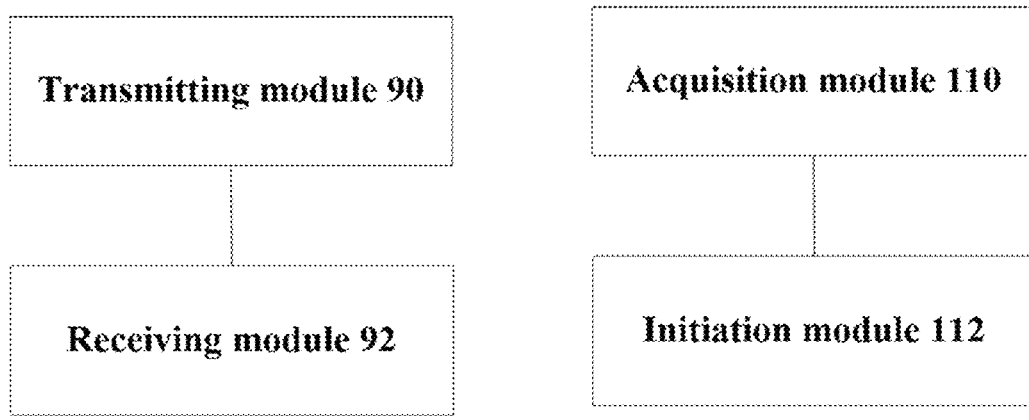
FIG. 9 is a block diagram (1) showing a device for implementing session continuity according to embodiment III of the present disclosure.
FIG. 11 is a block diagram showing a device for implementing session continuity according to embodiment IV of the present disclosure.

FIG. 9 is a block diagram (1) showing a device for implementing session continuity according to embodiment III of the present disclosure. As shown in FIG. 9, the device includes a transmitting module 90 and a receiving module 92.

The transmitting module 90 is configured to transmit indication information to a UE. The indication information is used for indicating the UE that a first protocol data unit (PDU) session currently established needs to be redirected to a terminating user-plane function (TUPF).

The receiving module 92 is configured to receive a request message, initiated by the UE after the indication information is received by the UE, for establishing a second PDU session. The request message carries a session identifier of the first PDU session for uniquely identifying the first PDU session.

With a combination of the various modules described above, after the indication information for indicating the UE that the first protocol data unit (PDU) session currently established is to be redirected to a TUPF is transmitted to the UE, the request message, transmitted from the UE, for establishing the second PDU session is received. The request message carries the session identifier of the first PDU session for uniquely identifying the first PDU session. The above-mentioned technical solution solves the problem in the related art that it is impossible to determine from which PDU session the newly established PDU session is switched over when the UE is redirected to a new TUPF. Thus the network side is able to determine from which PDU session the newly established PDU session is redirected.

Figure 10:
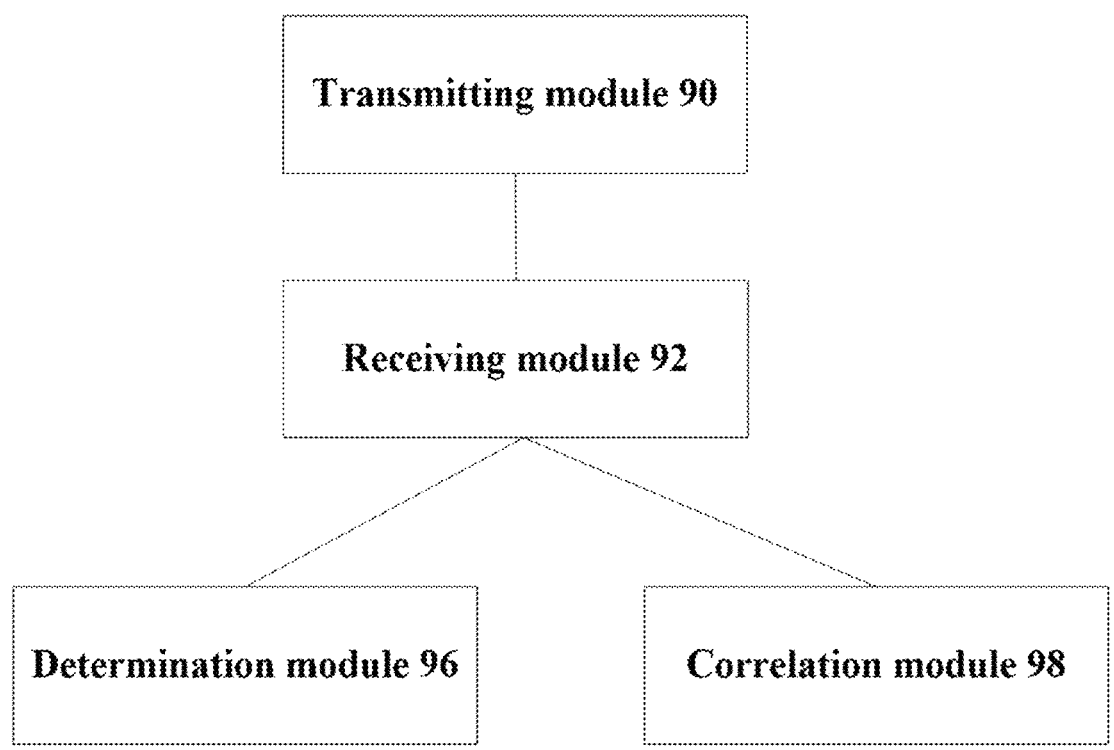
FIG. 10 is a block diagram (2) showing a device for implementing session continuity according to embodiment III of the present disclosure.

FIG. 10 is a block diagram (2) showing a device for implementing session continuity according to embodiment III of the present disclosure. As shown in FIG. 10, the above-mentioned device further includes a determination module 96 configured to determine that the first PDU session is redirected to the second PDU session according to the session identifier carried in the request message.

Optionally, the above-mentioned device further includes a correlation module 98 configured to correlate the second PDU session and an application function (AF) session according to the session identifier carried in the request message. The AF session is established when the UE accesses a specified application through the first PDU session.

Embodiment IV

An embodiment of the present disclosure further provides a device for implementing session continuity. The device is configured to implement the above-mentioned embodiments and preferred embodiments. What has been described will not be repeated. As used below, the term "module" may be software, hardware or a combination thereof capable of implementing predetermined functions. The device in the embodiment described below is preferably implemented by software, but implementation by hardware or by a combination of software and hardware is also possible and conceived.

FIG. 11 is a block diagram showing a device for implementing session continuity according to embodiment IV of the present disclosure. As shown in FIG. 11, the device includes an acquiring module 110 and an initiating module 112.

The acquiring module 110 is configured to acquire the session identifier of the first protocol data unit (PDU) established by the UE, where the session identifier is used for uniquely identifying the first PDU session.

The initiating module 112 is configured to initiate a request message for establishing the second PDU session to the network side device when the UE determines that the first PDU session currently established needs to be redirected to the terminating user-plane function (TUPF). The request message carries the session identifier of the first PDU session.

With a combination of the various modules described above, after the session identifier of the first PDU session is obtained, the request message for establishing the second PDU session is initiated to the network side device and the request message carries the session identifier of the first PDU session. The above-mentioned technical solution solves the problem in the related art that it is impossible to determine from which PDU session the newly established PDU session is switched over when the UE is redirected to a new TUPF. Thus the network side is able to determine from which PDU session the newly established PDU session is redirected.

Another embodiment of the present disclosure further provides a device for implementing session continuity. The device includes: a first transmitting module and a first receiving module.

The first transmitting module (corresponding to the transmitting module 90 of the above embodiment) is configured to transmit indication information to a UE, where the indication information is used for informing the UE to release a current first protocol data unit (PDU) session and establish a second PDU session to the same data network.

The first receiving module (corresponding to the receiving module 92 of the above embodiment) is configured to receive a request message for establishing the second PDU session initiated by the UE after the UE receives the indication information. The request message carries a session identifier of the first PDU session for uniquely identifying the first PDU session.

Another embodiment of the present disclosure further provides a device for implementing session continuity. The device includes: a second receiving module and a selection module.

The second receiving module (corresponding to the receiving module 92 of the above embodiment) is configured to receive a request message for establishing a second PDU session initiated by a UE. The request message carries a session identifier of a first PDU session for uniquely identifying the first PDU session.

The selection module is configured to select a session management function (SMF) of the first PDU session for the second PDU session according to the session identifier of the first PDU session.

Another embodiment of the present disclosure further provides a device for implementing session continuity. The device includes: a third receiving module and a correlation module.

The third receiving module (corresponding to the receiving module 92 of the above embodiment) is configured to receive a request message for establishing a second policy control session corresponding to a second PDU session requested by a UE. The request message carries a session identifier of a first PDU session for uniquely identifying the first PDU session.

The correlation module is configured to correlate the second policy control session with an application function (AF) session according to the session identifier of the first PDU session carried in the request message. The AF session is established when the UE accesses a specified application through the first PDU session.

Another embodiment of the present disclosure further provides a device for implementing session continuity applied to a UE. The device includes a fourth receiving module and a second transmitting module.

The fourth receiving module (corresponding to the receiving module 92 of the above embodiment) is configured to receive indication information from a network. The indication information is used for informing a UE to release a current first protocol data unit (PDU) session and establish a second PDU session to the same data network.

The second receiving module (corresponding to the transmitting module 90 of the above embodiment) is configured to transmit a request message for establishing the second PDU session to the network. The request message carries a session identifier of the first PDU session for uniquely identifying the first PDU session.

It is to be noted that the various modules described above may be implemented by software or hardware. Implementation by hardware may, but is not limited to, be performed in the following modes: the various modules described above are located in the same processor, or the various modules described above are located in their respective processors in any combination form.

In order to better understand the implementation process of the session continuity described above, the above-mentioned technical solution is described below in conjunction with the preferred embodiments which are not intended to limit the embodiments of the present disclosure.

Preferred Embodiment I

Figure 12:
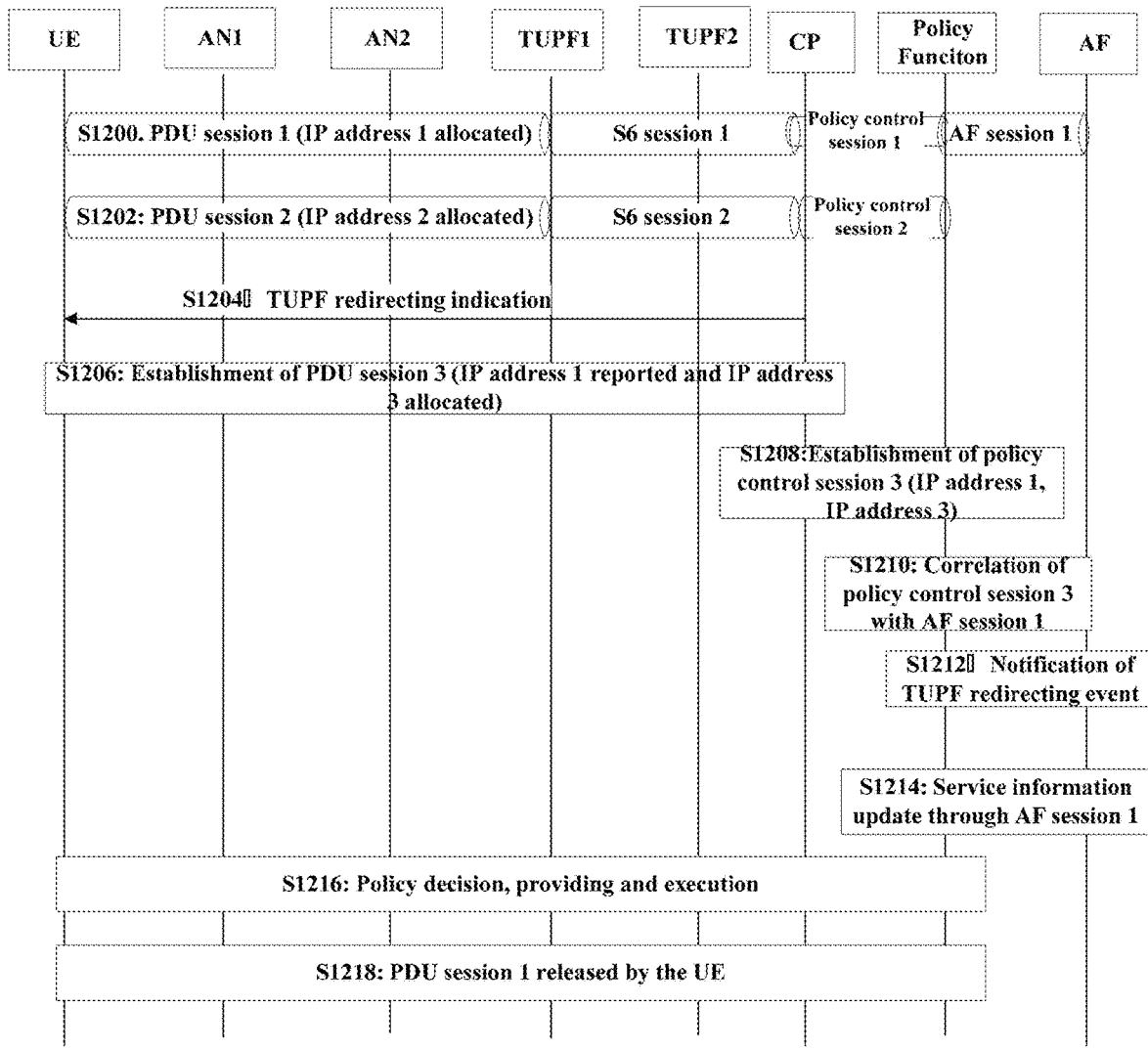
FIG. 12 is a flowchart showing a method for implementing session continuity according to preferred embodiment I of the present disclosure.

FIG. 12 is a flowchart showing a method for implementing session continuity according to preferred embodiment I of the present disclosure. As shown in FIG. 12, the method includes steps described below.

In S1200, a UE requests a network to establish PDU session 1, carried with a user id and a DN name, at AN1. The network selects the SSC mode 3 and TUPF 1 for PDU session 1, and allocates IP address1 to PDU session 1. Sx session 1 exists between TUPF 1 and the CP, and policy control session 1 exists between the CP and a policy function. The UE accesses an application through the PDU session 1. The AF corresponding to the application establishes AF session 1 to provide service information to the policy function, and the policy function correlates AF session 1 with PDU session 1 (that is, correlates AF session 1 with policy control session 1). In this process, after receiving a request message transmitted from the AN1 for establishing PDU session 1, the AMF in the CP selects a SMF and transmits the request message for establishing PDU session 1 to the SMF. The SMF further selects a policy function. The SMF returns an acknowledgement message to the AMF, where the acknowledgement message carries IP address 1. The AMF further returns the acknowledgement message to the AN. The AMF may save the correspondence between IP address 1 and the SMF.

In S1202, the UE requests the network to establish PDU session 2, carried with the user id and the DN name, at the AN1. The network selects TUPF 1 for PDU session 2 and allocates IP address 2 to PDU session 2. Sx session 2 exists between TUPF 1 and the CP, and policy control session 2 exists between the CP and the policy function. In this process, after receiving the request message transmitted from AN1 for establishing PDU session 2, the AMF in the CP selects a SMF and transmits the request message for establishing PDU session 2 to the SMF. The SMF further selects a policy function. The SMF returns an acknowledgement message to the AMF, where the acknowledgement message carries IP address 2. The AMF further returns the acknowledgement message to the AN. The AMF may save the correspondence between IP address 2 and the SMF.

In S1204, the UE moves to AN2, the network decides that TUPF 1 is not optimal for PDU session 1 and PDU session 2, and a new TUPF needs to be reselected. Therefore, the network (usually SMF) transmits a TUPF redirecting message to the UE. That is, the network informs the UE that PDU session 1 and PDU session 2 are be released after a period of time, and informs the UE to establish a new PDU session to the same DN.

In S1206, after the UE receives the redirecting message (that is, the message in which the network informs the UE that PDU session 1 and PDU session 2 are to be released, and informs the UE to establish a new PDU session in the same DN), the UE first decides to redirect PDU session 1. Therefore, the UE transmits a request message for establishing a new PDU session (PDU session 3) to the network, where the message carries the user Id, the DN name, the IP address of PDU session 1 (IP address 1), the TUPF redirecting indication information and the like. The network (i.e., CP) selects a new TUPF (i.e., TUPF 2) for the UE, and allocates a new IP address (IP address 3).

In S1208, the CP transmits a message for requesting a new policy control session (policy control session 3) to the policy function. The message carries the newly allocated IP address (IP address 3), the TUPF redirecting indication (optional), the old IP address (IP address1) and the DN name.

The CP in step S1200/S1202 and the CP in step S1208 may be the same or different. If the same SMF needs to be selected, the AMF may select the original SMF according to IP address 1 and the correspondence saved after receiving the request message transmitted from AN2 for establishing PDU session 3. When the SMF returns an acknowledgment message to the AMF, the AMF saves the correspondence between IP address 3 and the SMF. The SMF may also select the original policy function according to IP address 1.

In S1210, the policy function determines that PDU session 1 is redirected according to the TUPF redirecting indication or the old IP address 1 (the establishment of PDU session 3 is triggered by the message of step S1204), and correlates PDU session 3 with AF session 1 (i.e., correlates policy control session 3 with AF session 1) according to IP address 1.

In S1212, the policy function transmits a message to the AF to notify the TUPF redirecting event (user plane reselection event).

In S1214, the AF provides updated service information to the policy function through AF session 1 after an application layer interaction is performed between the UE and an application server.

In S1216, the policy function makes policy decision and provides policy information to TUPF 2 and AN2 so that TUPF 2 and AN2 execute the policy.

In S1218, the UE initiates a process and releases PDU session 1.

In the above-mentioned embodiment, the policy function and the CP are assumed to be independent functional entities. In other embodiments, the policy function is also integrated in the CP. In specific implementation, the interaction between the CP and the policy function is internal interaction and may be ignored. The interaction between the AF and the policy function is an interaction between the AF and the CP. That is, the CP correlates AF session 1 with PDU session 3 according to IP address 1 reported by the UE.

Preferred Embodiment II

Figure 13:
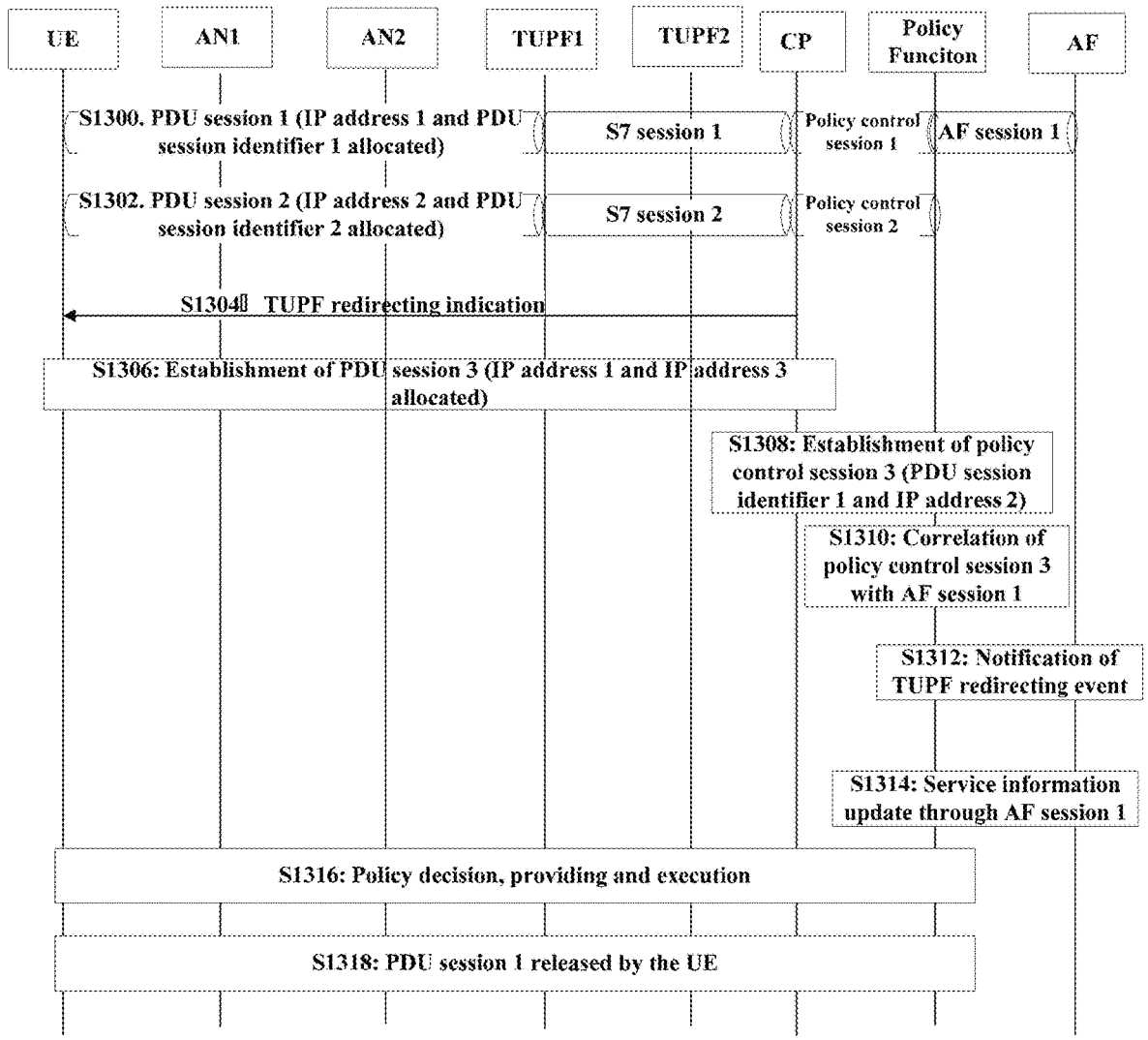
FIG. 13 is a flowchart showing a method for implementing session continuity according to preferred embodiment II of the present disclosure.

FIG. 13 is a flowchart showing a method for implementing session continuity according to preferred embodiment II of the present disclosure. As shown in FIG. 13, the method includes steps described below.

In S1300, a UE requests a network to establish PDU session 1, carried with a user id and a DN name, at AN1. The network selects TUPF 1 for PDU session 1 and allocates IP address 1 to PDU session 1. Further, the network allocates PDU session identifier 1 to PDU session 1. The user Id, the DN name, and PDU Session 1 may uniquely identify PDU session 1. Sx session 1 exists between TUPF 1 and the CP, and policy control session 1 exists between the CP and the policy function. The UE accesses an application through PDU session 1. The AF corresponding to the application establishes AF session 1 to provide service information to the policy function, and the policy function correlates AF session 1 with policy control session 1. In this process, after receiving the request message transmitted from AN1 for establishing PDU session 1, the AMF in the CP selects a SMF and transmits the request message for establishing PDU session 1 to the SMF. The SMF further selects a policy function. The SMF returns an acknowledgement message to the AMF, where the acknowledgement message carries PDU session identifier 1. The AMF further returns the acknowledgement message to the AN. The AMF may save the correspondence between PDU session identifier 1 and the SMF. Optionally, PDU session identifier 1 may also be allocated by the UE, and carried in the request message for establishing the PDU session 2 so as to be transmitted to the AMF, SMF and policy function.

In S1302, the UE requests the network to establish PDU session 2, carried with the user id and the DN name, at AN1. The network selects TUPF 1 for PDU session 2, and allocates IP address 2 to PDU session 2. Further, the network allocates PDU session identifier 2 to PDU session 2. The user Id, the DN name, and PDU session 2 may uniquely identify PDU session 2. Sx session 2 exists between TUPF 1 and the CP, and policy control session 2 exists between the CP and the policy function. In this process, the AMF in the CP receives the request message transmitted from AN1 for establishing PDU session 2. The SMF further selects a policy function. The SMF returns an acknowledgement message to the AMF, where the acknowledgement message carries PDU session identifier 2. The AMF further returns the acknowledgement message to the AN. The AMF may save the correspondence between PDU session identifier 2 and the SMF. Optionally, PDU session identifier 1 may also be allocated by the UE, and carried in the request message for establishing PDU session 2 so as to be transmitted to the AMF, SMF and policy function.

In S1304, the UE moves to AN2, the network decides that TUPF 1 is not optimal for PDU session 1 and PDU session 2, and a new TUPF needs to be reselected. Therefore, the network (usually SMF) transmits a TUPF redirecting message to the UE. That is, the network informs the UE that PDU session 1 and PDU session 2 are be released, and informs the UE to establish a new PDU session to the same DN.

In S1306, after the UE receives the redirecting message (that is, the message in which the network informs the UE that PDU session 1 and PDU session 2 are to be released, and informs the UE to establish a new PDU session in the same DN), the UE first decides to redirect PDU session 1. Therefore, the UE transmits a request message for establishing a new PDU session (PDU session 3) to the network, where the message carries the user Id, the DN name, the PDU session identifier 1, the TUPF redirecting indication information and the like. The network selects a new TUPF (i.e., TUPF 2) for the UE, and allocates a new IP address (IP address 3).

In S1308, the CP transmits a message for requesting a new policy control session (policy control session 3) to the policy function. The message carries the newly allocated IP address (IP address 3), the TUPF redirecting indication (optional), the PDU session identifier 1 and the DN name.

The CP in step S1300/S1302 and the CP in step S1308 may be the same or different. If the same SMF needs to be selected, the AMF may select the original SMF according to the PDU session identifier 1 and the correspondence saved after receiving the request message transmitted from AN2 for establishing PDU session 3. When the SMF returns an acknowledgment message to the AMF, the AMF saves the correspondence between PDU session identifier 3 and the SMF. The SMF may also select the original policy function according to PDU session identifier 3.

In S1310, the policy function determines that PDU session 1 is redirected according to the TUPF redirecting indication or PDU session identifier 1, and correlates PDU session 3 with AF session 1 (i.e., correlates policy control session 3 with AF session 1) according to PDU session identifier 1.

In S1312, the policy function transmits a message to the AF to notify the TUPF redirecting event (user plane reselection event).

In S1314, the AF provides updated service information to the policy function through AF session 1 after an application layer interaction is performed between the UE and an application server.

In S1316, the policy function makes the policy decision and provides policy information to TUPF 2 and AN2 so that TUPF 2 and AN2 execute the policy.

In S1318, the UE initiates a process and releases PDU session 1.

In the above-mentioned embodiment, the policy function and the CP are assumed to be independent functional entities. In other embodiments, the policy function is also integrated in the CP. In specific implementation, the interaction between the CP and the policy function is internal interaction and may be ignored. The interaction between the AF and the policy function is the interaction between the AF and the CP. That is, the CP correlates AF session 1 with PDU session 3 according to PDU session identifier 1 reported by the UE.

Preferred Embodiment III

Figure 14:
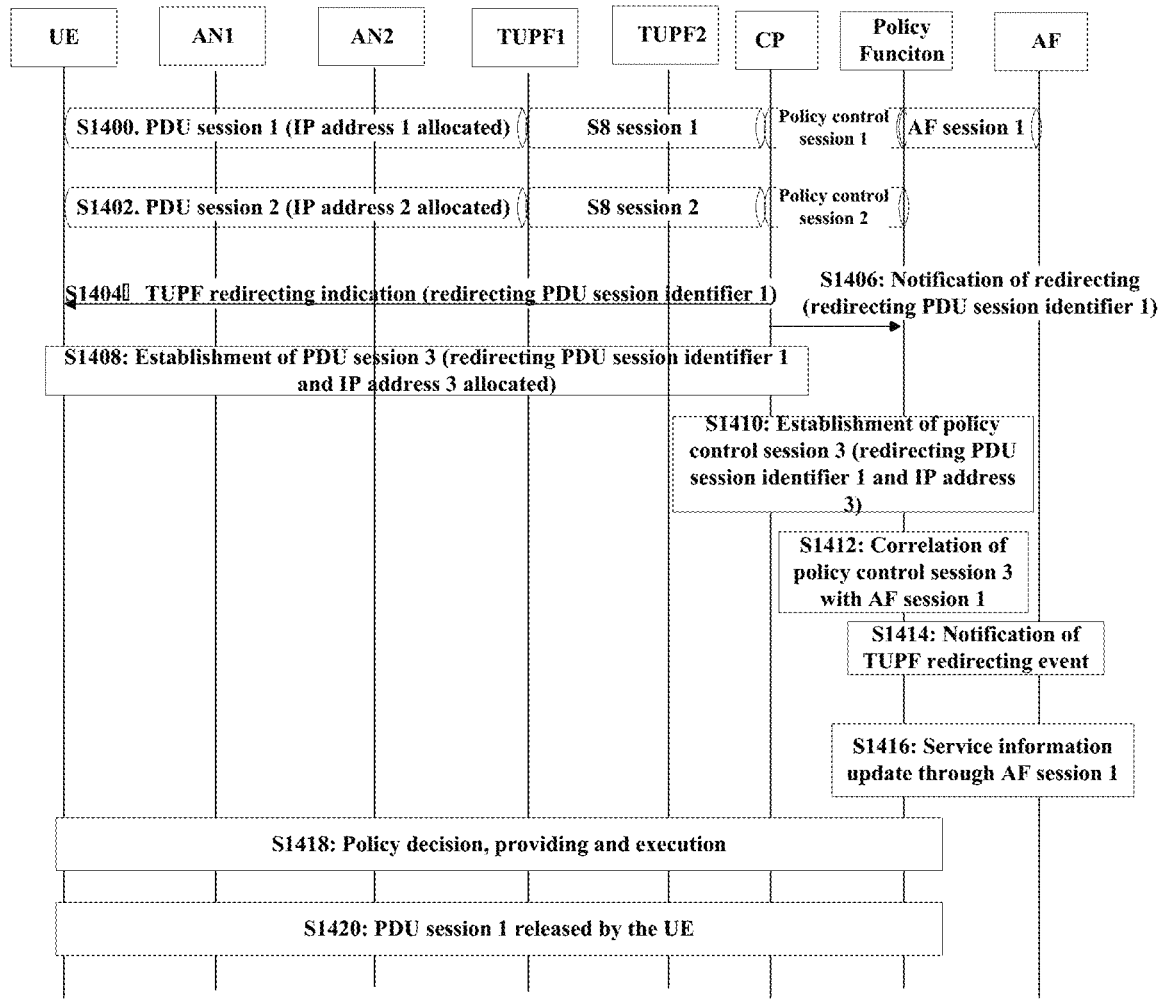
FIG. 14 is a flowchart showing a method for implementing session continuity according to preferred embodiment III of the present disclosure.

FIG. 14 is a flowchart showing a method for implementing session continuity according to preferred embodiment III of the present disclosure. As shown in FIG. 14, the method includes steps described below.

In S1400, a UE requests a network to establish PDU session 1, carried with the user id and the DN name, at AN1. The network selects TUPF 1 for PDU session 1, and allocates IP address 1 to PDU session 1. Sx session 1 exists between TUPF 1 and the CP, and policy control session 1 exists between the CP and a policy function. The UE accesses an application through PDU session 1. The AF corresponding to the application establishes AF session 1 to provide service information to the policy function, and the policy function correlates AF session 1 with policy control session 1. In this process, after receiving the request message transmitted from AN1 for establishing PDU session 1, the AMF in the CP selects a SMF and transmits the request message for establishing PDU session 1 to the SMF. The SMF further selects a policy function. The SMF returns an acknowledgement message to the AMF, and the AMF further returns the acknowledgement message to the AN.

In S1402, the UE requests the network to establish PDU session 2, carried with the user id and the DN name, at AN1. The network selects TUPF 1 for PDU session 2, and allocates IP address 2 to PDU session 2. Sx session 2 exists between TUPF 1 and the CP, and policy control session 2 exists between the CP and the policy function. In this process, after receiving the request message transmitted from AN1 for establishing PDU session 2, the AMF in the CP selects a SMF and transmits the request message for establishing PDU session 2 to the SMF. The SMF further selects a policy function. The SMF returns an acknowledgement message to the AMF, and the AMF further returns the acknowledgement message to the AN.

In S1404, the UE moves to AN2, the network decides that TUPF 1 is not optimal for PDU session 1 and PDU session 2, and a new TUPF needs to be reselected. Therefore, the network (usually SMF) transmits a TUPF redirecting message to the UE (that is, the network informs the UE that PDU session 1 is be released, and informs the UE to establish a new PDU session in the same DN). The message carries redirecting PDU session identifier 1 corresponding to PDU1 session 1. In this process, the TUPF redirecting message is transmitted by the SMF to the UE through the AMF, and the AMF saves the correspondence between redirecting PDU session identifier 1 and the SMF.

In S1406, after the UE receives the redirecting message (that is, the message in which the network informs the UE that PDU session 1 is to be released, and informs the UE to establish a new PDU session in the same DN), the UE decides to redirect PDU session 1. Therefore, the UE transmits a request message for establishing a new PDU session (PDU session 3) to the network, where the message carries the user Id, the DN name, the redirecting PDU session identifier 1, the TUPF redirecting indication information and the like. The network selects a new TUPF (i.e., TUPF 2) for the UE, and allocates a new IP address (IP address 3).

In S1408, the CP notifies the policy function of the redirecting PDU session identifier 1 corresponding to PDU session 1.

In S1410, the CP transmits a message for requesting a new policy control session (policy control session 3) to the policy function. The message carries the newly allocated IP address (IP address 3), the TUPF redirecting indication (optional), the redirecting PDU session identifier 1 and the DN name.

The CP in step S1400/S1402 and the CP in step S1410 may be the same or different. If the same SMF needs to be selected, the AMF may select the original SMF according to the redirecting PDU session identifier 1 and the correspondence saved after receiving the request message transmitted from the AN2 for establishing PDU session 3. The SMF may also select the original policy function according to PDU session identifier 3.

In S1412, the policy function determines that PDU session 1 is redirected according to the TUPF redirecting indication or the redirecting PDU session identifier 1, and correlates the PDU session 3 with AF session 1 (i.e., correlates policy control session 3 with AF session 1) according to the redirecting PDU session identifier 1.

In S1414, the policy function transmits a message to the AF to notify the TUPF redirecting event (user plane reselection event).

In S1416, the AF provides updated service information to the policy function through AF session 1 after an application layer interaction is performed between the UE and the application server.

In S1418, the policy function makes a policy decision and provides policy information to TUPF 2 and AN2 so that TUPF 2 and AN2 execute the policy.

In S1420, the UE initiates a process and releases PDU session 1.

It is to be noted that the policy function and the CP are assumed to be independent functional entities in the above-mentioned embodiment, and the policy function is also integrated in the CP in other embodiments. In specific implementation, the interaction between the CP and the policy function is internal interaction and may be ignored. The interaction between the AF and the policy function is the interaction between the AF and the CP. That is, the CP correlates AF session 1 with PDU session 3 according to PDU session identifier 1 reported by the UE.

In the embodiment of the present disclosure, the original PDU session redirected by the newly established PDU session is negotiated between the UE and the network, and a corresponding AF session is determined accordingly.

Similarly, the network may also apply some policies implemented in the original PDU session to the newly established PDU session.

In summary, the embodiments of the present disclosure achieve the following technical effects: The embodiments solve the problem in the related art that it is impossible to determine from which PDU session the newly established PDU session is switched over when a UE is redirected to a new TUPF. Thus the network side is able to determine from which PDU session the newly established PDU session is redirected.

An embodiment of the present disclosure further provides a storage medium. Optionally, in the embodiment, the storage medium may be configured to store program codes for executing the method for processing page content according to the above-mentioned embodiment I.

Optionally, in the embodiment, the storage medium may be located in any one of a group of computer terminals in a computer network, or located in any one of a group of mobile terminals.

Optionally, in the embodiment, the storage medium is configured to store program codes for executing steps described below.

In S1, indication information is transmitted to a UE, where the indication information is used for indicating the UE that a first protocol data unit (PDU) session currently established is to be redirected to a terminating user-plane function (TUPF).

In S2, a request message for establishing a second PDU session, which is initiated by the UE after the UE receives the indication information, is received. The request message carries a session identifier of the first PDU session for uniquely identifying the first PDU session.

An embodiment of the present disclosure further provides a storage medium. Alternatively, in the embodiment, the storage medium may be configured to store program codes for executing steps described below.

In S1, a session identifier of a first protocol data unit (PDU) session established by a UE is obtained, where the session identifier is used for uniquely identifying the first PDU session.

In S2, a request message for establishing a second PDU session is initiated to the network side device when the UE determines that the first PDU session currently established needs to be redirected to the terminating user-plane function (TUPF). The request message carries the session identifier of the first PDU session.

The serial numbers of the above embodiments of the present disclosure are merely for ease of description and do not indicate superiority and inferiority of the embodiments.

In the above embodiments of the present disclosure, the description of each embodiment has its own emphasis. For a part not described in detail in one embodiment, reference may be made to related description of other embodiments.

It is to be understood that the technical content disclosed in embodiments of the present application may be implemented in other ways. The apparatus embodiments described above are merely illustrative. For example, a unit classification is merely a logical function classification, and, in practice, the unit classification may be implemented in other ways. For example, multiple units or components may be combined or may be integrated into another system, or some features may be ignored or not executed. Additionally, the presented or discussed mutual coupling, direct coupling or communication connections may be indirect coupling or communication connections via interfaces, units or modules, or may be electrical or in other forms.

The units described above as separate components may or may not be physically separated. Components presented as units may or may not be physical units, i.e., may be located in one place or may be distributed on multiple network units. Part or all of these units may be selected according to actual requirements to achieve objects of the solutions in the embodiments of the present disclosure.

Additionally, various functional units in embodiments of the present disclosure may be integrated into one processing unit, or each unit may be physically present separately, or two or more units may be integrated into one unit. The integrated unit may be implemented by hardware or a software functional unit.

The integrated unit may be stored in a computer-readable storage medium if implemented in the form of a software functional unit and sold or used as an independent product. Based on this understanding, solutions provided by the present disclosure substantially, or the part contributing to the related art, may be embodied in the form of a software product. The computer software product is stored on a storage medium and includes several instructions for enabling a computer device (which may be a personal computer, a server, a network device or the like) to execute all or part of steps in the methods provided by embodiments of the present disclosure. The foregoing storage medium includes: a USB flash drive, a read-only memory (ROM), a random access memory (RAM), a mobile hard disk, a magnetic disk, an optical disk or another medium capable of storing program codes.

The above are only preferred embodiments of the present disclosure and are not intended to limit the present disclosure. For those skilled in the art, the present disclosure may have various modifications and variations. Any modifications, equivalent substitutions, improvements and the like made within the spirit and principle of the present disclosure should fall within the scope of the present disclosure.

What is claimed is:

1. A method of implementing session continuity, comprising:

transmitting indication information to a user equipment (UE), wherein the indication information informs the UE to redirect a current first protocol data unit (PDU) session associated with a terminating user-plane function (TUPF); and receiving a request message, initiated by the UE after the indication information is received by the UE, for establishing a second PDU session, wherein a session identifier of the first PDU session is carried in the request message, the session identifier of the first PDU session uniquely identifies the first PDU session.

2. The method according to claim 1, further comprising:
determining, after receiving the request message and according to the session identifier of the first PDU session carried in the request message, that the second PDU session is a session redirected from the first PDU session.

3. The method according to claim 1, wherein the session identifier of the first PDU session comprises a session identifier allocated to the first PDU session when the first PDU session is established.

4. A method of implementing session continuity, comprising:

receiving a request message, initiated by a user equipment (UE), for establishing a second protocol data unit (PDU) session, wherein a session identifier of a first PDU session is carried in the request message, the session identifier of the first PDU session uniquely identifies the first PDU session; and selecting, according to the session identifier of the first PDU session, a session management function (SMF) of the first PDU session for the second PDU session.

5. The method according to claim 4, wherein the session identifier of the first PDU session comprises a session identifier allocated to the first PDU session when the first PDU session is established.

6. A device for implementing session continuity, comprising:

a processor configured to:

transmit indication information to a user equipment (UE), wherein the indication information informs the UE to redirect a current first protocol data unit (PDU) session associated with a terminating user-plane function (TUPF); and receive a request message, initiated by the UE after the indication information is received by the UE, for establishing a second PDU session, wherein a session identifier of the first PDU session is carried in the request message, the session identifier of the first PDU session uniquely identifies the first PDU session.

7. The device according to claim 6, wherein the processor is further configured to:

determine, after the received request message and according to the session identifier of the first PDU session carried in the request message, that the second PDU session is a session redirected from the first PDU session.

8. The device according to claim 6, wherein the session identifier of the first PDU session comprises a session identifier allocated to the first PDU session when the first PDU session is established.

9. A device for implementing session continuity, comprising:

a processor configured to:

receive a request message, initiated by a user equipment (UE), for establishing a second protocol data unit (PDU) session, wherein a session identifier of a first PDU session is carried in the request message, the session identifier of the first PDU session uniquely identifies the first PDU session; and select a session management function (SMF) of the first PDU session for the second PDU session according to the session identifier of the first PDU session.

10. The device according to claim 9, wherein the session identifier of the first PDU session comprises a session identifier allocated to the first PDU session when the first PDU session is established.

11. A non-transitory computer-readable storage medium comprising instructions that when executed by a processor, configures the processor to perform a method comprising:

transmitting indication information to a user equipment (UE), wherein the indication information informs the UE to redirect a current first protocol data unit (PDU) session associated with a terminating user-plane function (TUPF); and receiving a request message, initiated by the UE after the indication information is received by the UE, for establishing a second PDU session, wherein a session identifier of the first PDU session is carried in the request message, the session identifier of the first PDU session uniquely identifies the first PDU session.

12. The non-transitory computer readable storage medium according to claim 11, wherein the processor is configured to perform the method further comprising:

determining, after the received request message and according to the session identifier of the first PDU session carried in the request message, that the second PDU session is a session redirected from the first PDU session.

13. The non-transitory computer readable storage medium according to claim 11, wherein the session identifier of the first PDU session comprises a session identifier allocated to the first PDU session when the first PDU session is established.

14. A non-transitory computer-readable storage medium comprising instructions that when executed by a processor, configures the processor to perform a method comprising:

receiving a request message, initiated by a user equipment (UE), for establishing a second protocol data unit (PDU) session, wherein a session identifier of a first PDU session is carried in the request message, the session identifier of the first PDU session uniquely identifies the first PDU session; and selecting a session management function (SMF) of the first PDU session for the second PDU session according to the session identifier of the first PDU session.

15. The non-transitory computer-readable storage medium according to claim 14, wherein the session identifier of the first PDU session comprises a session identifier allocated to the first PDU session when the first PDU session is established.

* * * * *

UNITED STATES PATENT AND TRADEMARK OFFICE
CERTIFICATE OF CORRECTION

PATENT NO. : 11,006,326 B2
APPLICATION NO. : 16/242993
DATED : May 11, 2021
INVENTOR(S) : Xiaoyun Zhou et al.

Page 1 of 1

It is certified that error appears in the above-identified patent and that said Letters Patent is hereby corrected as shown below:

On the Title Page

Item (54), in Title, in Column 1, Lines 1-2, delete "METHOD, DEVICE, AND SYSTEM FOR IMPLEMENTING SESSION CONTINUITY" and insert -- METHOD, DEVICE AND SYSTEM FOR IMPLEMENTING SESSION CONTINUITY --, therefor.

In the Specification

In Column 1, Lines 1-2, delete "METHOD, DEVICE, AND SYSTEM FOR IMPLEMENTING SESSION CONTINUITY" and insert -- METHOD, DEVICE AND SYSTEM FOR IMPLEMENTING SESSION CONTINUITY --, therefor.

In Column 2, Line 6, delete "includes" and insert -- include --, therefor.

In Column 7, Lines 63-64, delete "user identifier (ID)," and insert -- user identifier (user ID), --, therefor.

In Column 14, Line 58, delete "are be" and insert -- are to be --, therefor.

In Column 16, Line 40, delete "are be" and insert -- are to be --, therefor.

In Column 18, Line 6, delete "is be" and insert -- is to be --, therefor.

In the Claims

In Column 22, Line 19, in Claim 12, delete "computer readable" and insert -- computer-readable --, therefor.

In Column 22, Line 27, in Claim 13, delete "computer readable" and insert -- computer-readable --, therefor.

Signed and Sealed this
Sixth Day of July, 2021

Drew Hirshfeld
*Performing the Functions and Duties of the
Under Secretary of Commerce for Intellectual Property and
Director of the United States Patent and Trademark Office*